Aug. 29, 1961    W. F. COOK ET AL    2,997,880
MANOMETER SURGE TANK
Filed Nov. 3, 1958
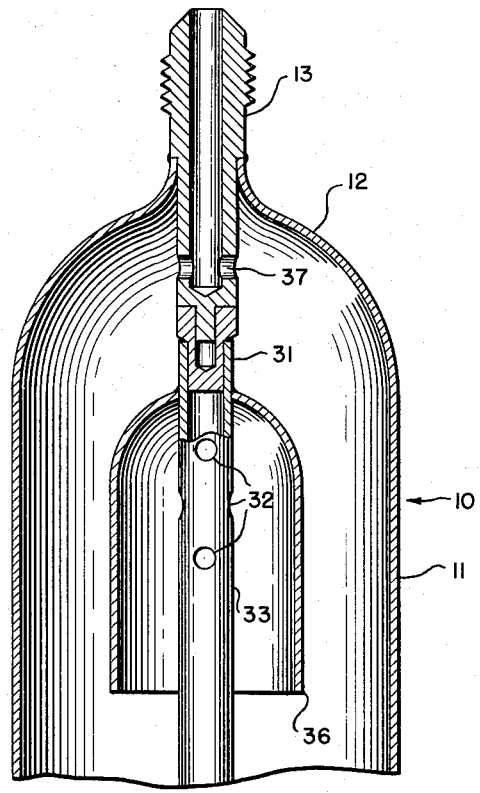
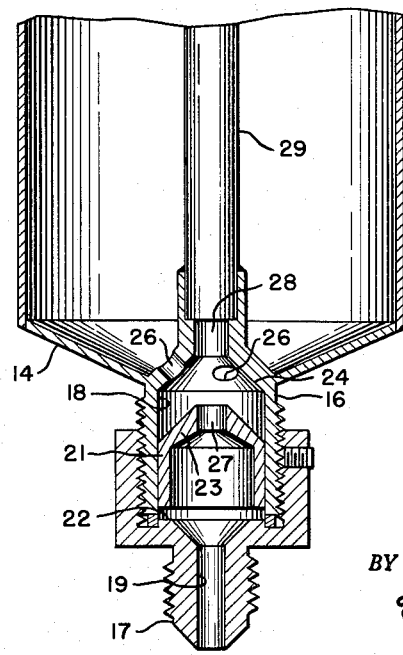
INVENTORS
WILLIAM F. COOK
JOHN A. ROBERTS
BY   GEORGE ROETHEL
ATTORNEY

United States Patent Office 2,997,880
Patented Aug. 29, 1961

2,997,880
MANOMETER SURGE TANK
William F. Cook, El Cajon, and John A. Roberts and George Roethel, San Diego, Calif., assignors to General Dynamics Corporation, San Diego, Calif., a corporation of Delaware
Filed Nov. 3, 1958, Ser. No. 771,488
6 Claims. (Cl. 73—401)

This invention relates to manometer surge tanks and more particularly to a tank for capturing the liquid from a manometer which has been over pressurized and automatically returning the liquid to the manometer after the excessive pressure has been removed.

Differential pressure indicators and low volume flow meters operate on the principle of pressure from one source being urged against pressure from another source through a liquid medium in a container. The resultant pressure forces the liquid to move in the container in the direction of the lesser pressure and its movement is the measure of pressure differential. In certain applications this pressure differential is also indicative of fluid movement.

If there should be a sudden failure or large increase in pressure from one of the two sources, the liquid within the container will be driven with great force or rapidity in the direction of the lesser pressure to the extent that the liquid will pass out of the container and into the fluid line and contaminate the system being measured or regulated. To prevent this from occurring numerous liquid traps have been improvised to catch and retain the liquid from the indicator or gauge when this great or sudden change in pressure occurs. However, these traps have certain defects such as having no way of returning the liquid to its container after the proper pressures have been restored or forcing fluid continuing to pass through the trap to pass through the liquid trapped therein. This causes the liquid to bubble and minute particles of liquid escape with the passage of the fluid through the trap.

The present invention in its preferred embodiment comprises a manometer surge tank for trapping mercury escaping from a manometer which has become overpressurized or wherein the pressure at one end of the line has suddenly failed. This tank includes an inlet gas bypass check valve at the lower end of the tank, a mercury-gas deflector near the upper end of the tank and a gas outlet at the top. A poppet type valve closes an orifice in the bottom when excessive pressure drives the mercury from the manometer and into the tank. The mercury and gas is driven through an inner tube to the deflector at the top. Here the mercury falls to the bottom of the tank while the gas passes out the top. Gas is prevented from entering the bottom of the tank and passing through the mercury pool. Thus the gas does not cause the mercury pool to boil and pass with the gas out of the tank. When pressure is relieved, the poppet valve opens and the mercury returns to the manometer.

It is therefore an object of this invention to provide for an improved surge tank for trapping fluid from a differential pressure or flow indicator to prevent its flow into the system under use or test.

Another object is the provision of a manometer surge tank wherein the liquid trapped therein is automatically restored to the manometer when the excessive differential pressure has been removed.

Another object is the provision of a manometer surge tank wherein the escaping fluid does not pass through the liquid trapped in the tank.

Another object is the provision of a manometer surge tank wherein the fluid enters the bottom and leaves the top except during excessive pressure, at which time the bottom valve is closed and fluid enters and leaves the tank from the top.

Another object is the provision of a manometer surge tank having a novel poppet valve in the bottom to admit fluid into the bottom of the tank under a predetermined maximum pressure, to admit fluid and manometer liquid at the top of the tank under excessive pressures and return of the liquid to the manometer when the excessive pressure has been removed.

Other objects and features of the present invention will be readily apparent to those skilled in the art from the following specification and appended drawings wherein is illustrated a preferred form of the invention, and in which:

The drawing shows a vertical cross-sectional view of the tank.

Referring now to the drawing there is shown a fluid tight tank 10 having cylindrical walls 11, a dome shaped upper end 12 terminating in a centrally located outlet fitting 13, and an inverted conical base 14, all integrally connected such as by welding. This base 14 includes a valve housing 16 to which is threadedly attached an inlet fitting 17 in fluid tight relationship. This fitting 17 is adapted for connection to the low pressure side of the manometer, not shown. The valve housing 16 has an axial inner bore 18 of a diameter larger than the passageway 19 through the fitting. Within the bore 18 is a cylindrical valve member 21 adapted to normally seat against shoulder 22 of the fitting 17. This valve member has a top portion 23 shaped to abut against the under top surface 24 of the housing 16, closing the orifices 26 in the base communicating between the housing 16 and the inner portion of tank 10. Valve member 21 has a central orifice 27 in its top through which all fluid must pass before it may enter the tank. From this orifice 27 the fluid may pass through orifices 26 when the valve member 21 is seated against shoulder 22 of inlet fitting 17.

The top of the valve housing also has another opening 28 centrally positioned and aligned with orifice 27 in the valve member 21. This opening is not closed by the upward movement of the valve member 21. Attached to this central opening 28 and extending upwardly is a tube 29 which is closed at its upper end 31 and has a plurality of openings 32 in its cylinder wall 33 near the top. A dome shaped fluid deflector 34 is mounted above these openings 32 with a downward projecting rim 36 extending below the openings.

In operation valve member 21 normally seats against the inlet fitting shoulder 22. Fluid passes from the inlet fitting 17, through valve orifice 27 and orifices 26 in the base. The fluid travels to the top of the tank and out the passageway 37 in the outlet fitting 13. A sudden increased pressure differential accelerates the rate of fluid flow. This in turn creates a pressure differential between the inside of the valve member 21 and the top of the bore 18, driving the valve member 21 against the top and sealing orifices 26 against fluid passage. Fluids, including mercury from the manometer, must then flow through tube 29, out openings 32 and down the inside of the dome of the fluid deflector 34. At the rim 36 of the deflector the heavier fluid such as mercury will fall to the bottom of the tank while the lighter fluid such as gas will form a blanket over the heavier fluid and leave the tank via the outlet fitting 13 at the top. Any mercury droplets in the gas as it rises in the tube will impinge against the dome walls of the deflector, agglomerate and fall to the bottom of the tank.

After the differential pressure has been decreased, as by repair of a defective pressure line or a decrease in rate of fluid flow, valve member 21 becomes unseated from the top of the bore 18, resumes its normal position against shoulder 22 and the mercury in the bottom of the tank drains back into the manometer from whence it came. Normal operation is again restored.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. A monometer surge tank comprising a closed container having an outlet near the top and an inlet near the bottom thereof, means interconnecting said inlet to the interior of said tank near the bottom, means interconnecting said inlet to the interior of said tank near the top and directing fluid flow downwardly therein, and means for closing said interconnecting means near the bottom when fluid flowing therefrom exceeds a predetermined pressure.

2. A manometer surge tank comprising a closed container having an outlet, a valve housing, and an inlet, said inlet communicating with the interior of said container through said valve housing positioned therebetween, means connected to said valve housing for conducting fluid to the interior of said container near the top thereof, flow directing means for directing the initial flow of fluid entering said container from said connected means in a direction toward said valve housing, said valve housing communicating with the interior of said container near the bottom thereof, said valve housing having a valve therein, said valve being operable to prevent fluid flow from said housing into said interior near the bottom when said fluid exceeds a predetermined pressure.

3. A manometer surge tank comprising a closed container having an outlet at the top and a valve housing at the bottom, a plurality of orifices communicating between said housing and the interior of said container, said housing having a bore extending axially therein, a valve member movable within said bore to close said orifices in one position and open said orifices in another position, a fluid inlet fitting connected to said valve housing for transmitting fluid thereto, said valve member having cylindrical walls and a top with a central orifice therein to permit passage of fluid therethrough, said valve housing having a central opening in alignment with said central orifice to permit fluid passage therethrough when said plurality of orifices are closed by said valve member, means over said opening and extending toward the top of said container to provide fluid entrance into said container near the top thereof, said means being shielded and spaced from said outlet to thereby avoid direct flow of fluid thereto when said orifices are closed.

4. A manometer surge tank comprising a closed container having an outlet at the top and valve housing at the bottom, a plurality of orifices communicating between said housing and the interior of said container, said housing having a bore extending axially therein, a valve member movable within said bore to close said orifices in one position and open said orifices in another position, a fluid inlet fitting connected to said valve housing for transmitting fluid thereto, said valve member having cylindrical walls and a top with a central orifice therein to permit passage of fluid therethrough, said valve housing having a central opening in alignment with said central orifice to permit fluid passage therethrough when said plurality of orifices are closed by said valve member, a closed tube over said opening and extending toward the top of said container, a plurality of openings in said tube near the top thereof, and a dome shaped deflector extending over said openings to deflect downwardly the flow of fluid therefrom.

5. A manometer surge tank comprising a closed container having an outlet at the top and a valve housing at the bottom, a plurality of orifices communicating between said housing and the interior of said container, said housing having a bore extending axially therein, a valve member movable within said bore to close said orifices in one position and open said orifices in another position, a fluid inlet fitting connected to said valve housing for transmitting fluid thereto, said bore being of larger diameter than said inlet fitting, said valve member having cylindrical walls and a top with a central orifice therein to permit passage of fluid therethrough, said valve housing having a central opening in alignment with said central orifice to permit fluid passage therethrough when said plurality of orifices are closed by said valve member, a closed tube over said opening and extending toward the top of said container, a plurality of openings in said tube near the top thereof, and a dome shaped deflector extending over said openings to deflect downwardly the flow of fluid therefrom.

6. A manometer surge tank comprising a closed container having an outlet, a valve housing, and an inlet, said inlet communicating with the interior of said container through said valve housing positioned therebetween, said housing having a bore, a valve member axially movable therein, said valve member having a central orifice through which fluid entering said tank must pass, a plurality of orifices in said housing interconnecting the interior of said housing with the interior of said tank, said valve member when moved in one direction closing said orifices and when moved in the other direction opening said orifices, a central opening in said housing in alignment with said valve member central orifice, a closed tube over said central opening extending in the direction of said outlet, a plurality of openings in the wall of said tube near the closed end thereof to permit fluid flow into said tank from said central orifice when said valve member has closed said plurality of orifices, an inverted dome shaped deflector on said tube and over said tube openings for deflecting flow of said fluid back toward said inlet.

References Cited in the file of this patent

UNITED STATES PATENTS

| 552,678 | Uehling | Jan. 7, 1896 |
| 903,973 | Heiland | Nov. 17, 1908 |
| 1,848,233 | Swope et al. | Mar. 8, 1932 |

FOREIGN PATENTS

| 800,951 | Great Britain | Sept. 3, 1958 |